United States Patent [19]

Carlos et al.

[11] 3,859,266

[45] Jan. 7, 1975

[54] ALCOHOLYSIS PRODUCTS

[75] Inventors: Donald D. Carlos, Middletown;
Darrell D. Hicks, Jeffersontown,
both of Ky.

[73] Assignee: **Celanese Coatings & Specialties
Company,** New York, N.Y.

[22] Filed: Nov. 14, 1973

[21] Appl. No.: 415,848

[52] U.S. Cl. ... 260/86.1 E, 260/33.2 R, 260/33.4 R, 260/33.6 UA, 260/836, 260/837, 260/901
[51] Int. Cl. .... C08f 29/50, C08f 45/28, C08f 45/34
[58] Field of Search ..... 260/33.2 R, 86.1 E, 33.4 R, 260/33.6 UA, 836, 837, 901

[56] References Cited
UNITED STATES PATENTS

| | | | |
|---|---|---|---|
| 3,663,467 | 5/1972 | Albright | 260/86.1 E |
| 3,689,469 | 9/1972 | Inskip et al. | 260/86.1 E |
| 3,763,117 | 10/1973 | McKenna et al. | 260/86.1 E |
| 3,780,003 | 12/1973 | Seymour et al. | 260/86.1 E |

OTHER PUBLICATIONS

"Macromolecular Syntheses, 1, p. 5 (Wiley and Sons, 1963), (QD262 M26).

*Primary Examiner*—Allan Lieberman
*Assistant Examiner*—T. DeBenedictis, Sr.
*Attorney, Agent, or Firm*—Herbert P. Price, K. A. Geroni, Thomas J. Morgan

[57] ABSTRACT

A thermosetting polymeric composition useful in preparing protective coatings is disclosed comprising:

1.
   a. a first polymer containing at least three aliphatic hydroxy groups per molecule and having a weight per hydroxy group of about 50 to 1000;
   b. a second polymer formed from at least one mol of a low molecular weight alcohol acrylate ester monomer per mol of hydroxy group in said first polymer;
2. a tin-based thermosetting curing catalyst, selected from tin alcoholates, carboxylates, halides and alkyl oxides; and
3. a solvent or dispersant therefor.

6 Claims, No Drawings

ALCOHOLYSIS PRODUCTS

BACKGROUND OF THE INVENTION

This invention relates to thermosetting compositions which are useful in preparing protective coatings. More particularly, this invention relates to multipolymeric systems containing an aliphatic, hydroxy-containing polymer, and a low molecular weight acrylate ester-containing polymer, whereby the two polymers are cross-linked by means of a curing catalyst.

Copending U.S. Pat. application, Ser. No. 415,847 entitled "Thermosetting Coatings from Non-Reactive Polymers," filed concurrently herewith, discloses the preparation of a thermosetting polymeric composition, containing a copolymer formed by copolymerizing monomers at least a part of which are low molecular weight alcohol ester monomers and hydroxy monomers, and mixing said copolymerized monomers with a thermosetting catalyst as further described hereinafter. This one-component system is then curable on baking.

While the aforementioned has the advantage of being essentially a single-component system, it is in some cases advantageous to prepare structurally differing polymeric systems separately and combine them by cross-linking.

The preparation and utilization of multicomponent systems has often been stymied by the lack of stability in such systems, especially in the presence of a system catalyst.

Therefore, it is an object of this invention to prepare multi-component curing systems which are relatively stable in the presence of a catalyst, but which condense under the desired conditions.

It is another object of this invention to prepare multi-component systems wherein each component is comprised of a polymer having a different molecular structure.

SUMMARY OF INVENTION

These and other objects are obtained by preparing the coatings described in the instant invention.

Basically, these coatings comprise a multicomponent system containing at least two polymers. The first polymer contains at least three aliphatic hydroxy groups per molecule and has a weight per hydroxy group of about 50–1,000. The second polymer contains at least one mol of a low-molecular weight alcohol acrylate ester per mol of hydroxy group in the first polymer. These two polymers are co-reacted on curing by catalysis with a tin compound. The final component of the system of the instant invention is a solvent or dispersant for the entire system, depending upon the solubility of the copolymers.

DESCRIPTION OF INVENTION

The polymers useful in the instant invention are of two classes. The first polymer or class of polymers useful in the instant invention is an aliphatic, hydroxy-containing polymer having about at least three hydroxy groups per molecule and a weight per hydroxy group of about 50–1,000, preferably 200–600. In addition, the hydroxy groups are preferably primary in nature.

Examples of the types of polymers which may furnish such aliphatic hydroxyl groups include polymers prepared from alpha beta ethylenically unsaturated monomers containing an alpha beta ethylenically unsaturated, aliphatic, hydroxy-containing monomer, with the remainder of the polymer being formed of vinyl monomers copolymerizable therewith. Examples of the monomers include allyl and methallyl alcohol, hydroxy alkyl esters of polymerizable acids, including the beta hydroxy alkyl esters of acrylic acid, methacrylic acid, crotonic acid, itaconic acid, and half acid esters of maleic and fumaric acids, formed with saturated alcohols having from 1 to 10 carbon atoms. The preferred hydroxy alkyl esters are those which contain 2 to 4 carbon atoms in the alkyl group. Examples of these esters are beta hydroxy ethyl acrylate, beta hydroxy ethyl methacrylate, beta hydroxy propylacrylate, beta hydroxy propyl methacrylate, beta hydroxy butyl crotonate, beta hydroxy propyl maleate, beta hydroxy ethyl fumarate, and the like. Beta hydroxy alkyl esters can generally be made by reacting a monoepoxide compound with a polymerizable, alpha beta ethylenically unsaturated acid. Additional beta hydroxy alkyl esters useful in preparing the hydroxy-containing monomers of this invention are made by reacting the polymerizable acids, as hereinabove described, with such monoepoxides as ethylene oxide, 1,2-propylene oxide, 1,2-butylene oxide, 2,3-butylene oxide, styrene oxide, phenyl glycidyl ether, butyl glycidyl ether, and the like. Most preferred of the hydroxy-containing monomers are beta hydroxy ethyl acrylate and beta hydroxy propyl acrylate.

In addition to the hydroxy monomer, the first type of copolymer useful in the instant invention can contain other ethylenically unsaturated monomers which are copolymerizable therewith. Examples of these monomers include styrene, vinyl toluene, vinyl acetate, vinyl proprionate, vinyl butyrate, vinyl laurate, vinyl oleate, vinyl stearate, and the other vinyl esters of fatty acids having from 1 to 18 carbon atoms. Likewise, the various esters of polymerizable acids, such as crotonic, itaconic, fumaric acid and maleic acids can be utilized.

Acrylonitrile, methacrylonitrile, acrylamide, methacrylamide, methylstyrene, allyl acetate, glycidyl methacrylate, t-butylaminoethyl methacrylate, vinyl pyrrolidone, N,N-dimethylaminoethyl methacrylate, ethylene, propylene, vinyl chloride, vinyl fluoride, vinylidene fluoride, hexafluoropropylene, chloratrifluoroethylene, and tetrafluorethylene can also be used as the monomers herein. tetrafluoroethylene In addition, of course, other acrylate esters or methacrylate esters may be utilized in the instant invention. However, the alcohol used in forming the ester group should contain more than 5 carbon atoms to insure that little inter-molecular cross-linking will occur when the compositions of the instant invention are baked. If, for example, methyl methacrylate were used at more than about the 20% level in conjunction with a hydroxy monomer, on baking the methyl methacrylate would cross-link with the hydroxy group within the polymer itself. Examples of the greater-than-five-carbon alcohol esters which may be utilized include 2-ethyl hexylacrylate or methacrylate, octyl acrylate or methacrylate, and the like.

A preferred type of hydroxy-containing copolymer is prepared by copolymerizing styrene and allyl or methallyl alcohol in the range of about 95% to 70% styrene, the remainder being allyl alcohol, or methallyl alcohol.

Generally any of the varied methods of vinyl polymerization may be utilized in preparing the vinyl monomer-containing polymers of the instant invention. Preferably, however, the various polymerization initiators are utilized. Examples include organic peroxides, such as tertiary butyl hydroperoxide, ditertiary butyl peroxide, cumene hydroperoxide, dicumyl peroxide, benzoyl peroxide, and the like. Equally suitable are organic peroxygen compounds, such as tetiary butyl peroxide acetate, tertiary butyl perbenzoate, ditertiary butyl diperthalate and the like. Other initiators include azodi-isobutyronitrile (AIBN), ultra-violet light, gamma radiation, etc.

The polymers of the instant invention may be prepared by a bulk polymerization process or by adding the above-described monomers in the reaction medium over a period ranging from 30 minutes to 10 to 12 hours. The polymerization initiator may be added to the reaction flask or may be mixed with the monomer, or separately added, depending upon the desired final product. Reaction temperatures may vary from 70° to 80° C. up to about 180° to 220° C. or higher, again depending upon the various desired end products and the monomers utilized.

The vinyl hydroxy polymers of the instant invention may be prepared in virtually any solvent in which the final polymer is soluble and which is not interferingly reactive with either the final product, the initiators or the monomers utilized. Examples of the solvents which may be utilized include, but are not limited to, the various alcohols, ester alcohols, ether alcohols, esters, and the like. In addition, minor amounts of petroleum-based solvents, such as mineral spirits, naphthas, and the like, may be utilized.

Instead of utilizing the vinyl hydroxy-containing polymers described above, so-called alkyd resins may be utilized, as long as the resin itself contains the aforementioned requisite range of aliphatic primary hydroxy groups. The methods for preparing these resins are well known in the art. In general, two basic methods are used. In the first a fatty acid is reacted with a mixture of polyols and polybasic acids, such as glycerine and phthalic anhydride. The second method commonly used entails the alcoholysis of a fatty oil, such as coconut oil, with a polyol, such as pentaerythritol, and then the further condensation of this reaction product with polyols and polybasic acids as above.

The preferred alkyd resins useful in this invention are those containing from about 5 to about 65 weight percent of a fatty acid or oil. Alkyd resins having less than about 5 percent fatty compound are classified as the "oil-less" alkyd resins or polyester resins described hereinafter. On the other hand alkyd resins containing greater than 65 percent of a fatty compound exhibit poor baking properties, poor chemical resistance and unsatisfactory adhesion properties.

Included among the various fatty acids and oils useful in preparing these alkyd resins are the fatty acids derived from the following oils: castor, dehydrated castor, coconut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1,4 butanediol, hexylene glycol, 1,6 hexanediol, the polyglycols, such as diethylene glycol or triethylene glycol, etc.; the triols such as glycerine, trimethylol ethane, trimethylol propane, etc., and other higher functional alcohols such as pentaerythritol, sorbitol, mannitol, and the like. Acids useful in preparing the alkyd resins of this invention include monofunctional acids, such as rosin acids, benzoic acid, para tertiary butyl benzoic acid and the like; the polyfunctional acids, such as adipic acid, azelaic acid, sebacic acid, phthalic acid or anhydride, isophthalic acid, terephthalic acid, dimerized and polymerized fatty acids, trimellitic acid, and the like.

In another instance the hydroxy-containing polymer is a polyester or "oil-less" alkyd resin. These resins are prepared by condensing nonfatty containing polyols and polyacids. Included among the useful polyacids are isophthalic acid, phthalic acid or anhydride, terephthalic acid, maleic acid or anhydride, fumaric acid, oxalic acid, sebacic acid, azelaic acid, adipic acid, etc. Monobasic acids such as benzoic, para tertiary butyl benzoic, and the like can also be utilized. Among the poly alcohols are the diols or glycols such as propylene glycol, ethylene glycol, butylene glycol, 1,4-butanediol, neopentyl glycol, hexylene glycol, 1,6-hexanediol, and the like; the triols such as trimethylol ethane, trimethylol propane and glycerine and various other higher functional alcohols such as pentaerythritol.

The preferred type of polyester resin comprises the reaction product of aromatic and aliphatic mono and dibasic acids with a mixture of diols and higher functional alcohols. In order to obtain the optimum cure properties and molecular weight it is desirable for the ratio of the equivalents of hydroxyl in the alcohol reactants to the equivalents of acid in the acid reactants to be from 1.1:1 to 1.75:1. Polyester resins having hydroxy to carboxyl equivalents ratios of less than about 1.1 generally gel before preparation is complete while those having ratios in excess of 1.75 are too low in molecular weight to have acceptable chemical resistance properties.

Yet another type of resinous material which may be utilized as the first copolymer of the instant invention are the so-called epoxy resins, which are basically polyglycidyl ethers of polyhydrid phenols obtained by reacting a polyhydric phenol in excess epichlorohydrin with sodium hydroxide. Examples of the polyhydride phenols include bisphenol-A(p,p'-dihydroxy diphenolpropane), resorcinol, hydroquinone, 4,4'-dihydroxy benzylphenone, bis(4-hydroxyphenol) ethane, 1–5 dihydroxy naphthalene, 4,4'-dihydroxybisphenyl and the like.

Other glycidyl ethers of polyhydric phenols are polymers prepared by reacting 1.1 up to about 2 mols of epichlorohydrin with 1 mol of dihydric phenol or by reacting polyepoxides with added polyhydric phenol.

Additional epoxide resins are glycidyl ethers of polyhydric alcohols, made by reacting a polyhydric alcohol in epichlorohydrin with an acid catalyst, such as boron trifluoride, and subsequently reacting the resulting product with an alkaline dehydrohalogenating agent. Included among the polyhydric alcohols which can be used in the preparation of these polyepoxides are ethylene glycol, pentaerythritol, propylene glycol, diethylene glycol, hexanediol, trimethylol ethane, trimethylol propane, and the like. In order to insure the presence of the requisite number of intermediate hydroxyl groups it is necessary that the polyepoxide be of relatively high molecular weight and in some instances, in fact, the initial polyepoxide material may be reacted with polyhydric phenols or alcohols to such an extent that the majority of the epoxide groups have been replaced by dimeror trimerization.

Yet another type of polymer useful herein is prepared by reacting an epoxide-containing monomer as described above, e.g., propylene oxide or ethylene oxide, with a polyol containing at least three hydroxyl groups per molecule. Examples of said polyols include glycerine, pentaerythritol, the polymer of pentaerythritol, trimethylpropane, trimethylolethane, and the like.

The second type of polymer useful in the instant invention is a vinyl copolymer prepared by methods similar to those described above, containing at least 1 mol of ester monomer per mol of hydroxyl monomer in the first copolymer, preferably about 2 to 5 moles of ester monomer. The ester monomer is a low carbon-containing alcohol acrylate ester, which is preferably selected from acrylate esters prepared from alcohols containing 5 carbon atoms or less, and is exemplified by the formula $$CH_2=CH-\overset{O}{\underset{\|}{C}}-OR$$

wherein R contains from one to five carbon atoms.

The final significant component of the instant invention is a catalyst for the crosslinking reaction which occurs when the polymers of the instant invention are baked. It is theorized that the reaction which enables crosslinking is in the nature of an alcoholysis reaction. In other words, the alcohol groups on the five-carbon-or-less alcohol acrylate ester is replaced with a pendant hydroxyl group in the polymeric backbone of the hydroxyl-containing polymer with the 5-carbon-or-less alcohol then being split off as an effluent. Crosslinking results.

The catalysts which may be used to effect this reaction are selected from

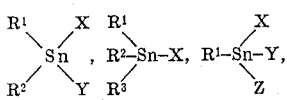

or

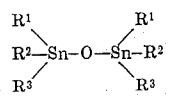

wherein $R^1$, $R^2$ and $R^3$ are 1 to 18 carbon atom alkyl or acyl groups and wherein X, Y and Z are

Cl—, Br—, I—, or —$OR^6$, wherein $R^5$ and $R^6$ are 1 to 18 carbon alkyl groups. The preferred catalysts are the dialkyl tin dicarboxylates, the dialkyl tin dichlorides, the trialkyl tin carboxylates, the trialkyl tin chlorides and the trialkyl tin oxides. The most preferred catalysts are dibutyl tin diacetate, dibutyl tin dilaurate and dibutyl tin dichloride.

The amount of the catalyst which is added is preferably 0.5% to 10% by weight, based on the total polymer solids content, more preferably 2% to 8%.

In order to prepare coatings from the products of the instant invention the polymeric material is blended with the catalyst described above in combination with various pigments, fillers, and other materials normally used in coatings systems. The material is then applied by spraying, brushing, dipping, etc. to the desired substrate, and baked at temperatures ranging from about 250° to 500° for from 30 seconds to 30 minutes, in order to produce a finished coating.

In the following examples all parts and percentages are by weight unless otherwise indicated.

EXAMPLE 1.

Into a reaction flash equipped with a mechanical agitator, reflux condenser and addition funnels were added 100 gms. of ethyl acrylate. The temperature of the reactor was allowed to increase to 99° C. and an air flow of 21 cc/min was begun. A slow addition of approximately 10 grams of 2-mercaptoethanol was carried out over 33 minutes as the temperature of the flash was allowed to increase to 120° C. The temperature was further allowed to increase over 20 minutes to about 120° C. and separate additions of the remainder of the mercaptoethanol (total addition 45 gms.) and the remainder of the ethyl acrylate (total addition 455 grams) were begun. With temperatures ranging from 110° C. to 130° C. the ethyl acrylate was added over about 3½ hours, while the mercaptoethanol was added over about 4½ hours, with about 3 ml. of the total amount of the mercaptoethanol being withheld.

Heating was continued with temperatures ranging between 125° and 138° C. over about an hour and a half.

At this point the addition of the remaining mercaptoethanol was carried out over about 25 minutes, and the contents of the flask were heated at between 138° and 144° for approximately 7½ hours. The contents of the flask were then distilled by oil pump vacuum, resulting in a product having a viscosity of Z to $Z_1$.

EXAMPLE 2.

A 60% solution in butyl Cellosolve of RJ-100, a styrene allyl alcohol copolymer, having a weight per hydroxyl group of about 300, available from the Monsanto Company and described in U.S. Pat. No. 2,894,938, was prepared. 8.3 parts of this material were blended with 5.0 parts of the copolymer of Example 1 and 0.4 parts of dibutyl tin diacetate. Utilizing 1 ½ mil drawdown bar on Bonderite 1000 cold roll steel panels, a film was prepared and baked at 350° F. for 30 minutes. The resulting coating exhibited excellent flow, gloss and mar resistance and passed 160 in/lb reverse impact. The pencil hardness was H to 2H.

EXAMPLE 3.

30 parts of PEP-450, a polymer prepared by copolymerizing pentaerythritol and propylene oxide, having an hydroxyl equivalent weight of 100 and an hydroxyl number of 555, which is available from Wyandotte Chemical Company, and 70 parts of the material prepared in Example 1 were blended with 2 parts of dibutyl tin dilaurate. Utilizing a 1 ½ mil drawdown bar and Bonderite 1000 cold roll steel, a film was prepared and baked at 400° F. for 30 minutes. The pencil hardness was 2B-B. After a 15 second xylene soak, it softened to greater than 4B, but did not dissolve. The material passed 160 in/lb reverse impact.

EXAMPLE 4.

Into a reaction flash equipped with a reflux condenser, additional funnel, thermometer, and agitator, were added 180 parts of xylene. The contents were heated under nitrogen to 125° C. and 120 parts of methylacrylate, 180 parts of ethylacrylate and 60 parts of ditertiary butyl peroxide were added over 2½ hours. The contents were held at 120° to 125° C. for an additional 2 hours, at which time 1.5 parts of ditertiary butyl peroxide and 20 parts of xylene were added over 40 minutes to the flask. The contents were held for a final hour at 120° to 127° C. resulting in a product having a solids content of 59.8%, a Gardner-Holt 25° C. viscosity of Q-R, and a Gardner color of less than 1. The product prepared above was reduced to 60% solids in butyl Cellosolve and 20 parts thereof were blended with 20 parts of a 40 % solids solution in butyl Cellosolve of Epi-Rez 530, a bisphenol-A epoxy resin available from Celanese Coatings Company, having a weight per epoxide of about 950, and a melting point of 80° C., and 0.4 parts of dibutyl tin diacetate. This blend was drawn down with a 2-mil drawdown blade on a Bonderite 37 steel panel and baked at 350° F. for 30 minutes. The film which resulted exhibited good flow and gloss. A 15 second xylene spot soak did not dissolve the film. However, a similar film prepared without use of the dibutyl tin diacetate did dissolve upon 15 second's application of xylene.

EXAMPLE 5.

The acrylic copolymer prepared in the preceding example was reduced to 60% solids in butyl Cellosolve and 20 parts thereof were blended with a 70% solids solution of RJ 100 in butyl Cellosolve, 0.4 parts of dibutyl tin diacetate and 14.6 parts of butyl Cellosolve. A clear solution resulted. A 2-mil drawdown was prepared on a Bonderite 37 steel panel and baked at 350° F. for 30 minutes. A film resulted having fair gloss and flow, fair to good mar resistance and very good adhesion. It was unaffected by a 5 second xylene spot test.

A similar film was prepared except that the dibutyl tin diacetate was left out of the formulation. A 5 second xylene spot test dissolved the film.

What is claimed is:

1. A thermosetting composition comprising a blend of:
    A. a first polymer containing at least three aliphatic hydroxy groups per molecule and having a weight per hydroxy group of about 50 to 1,000;
    B. a second polymer different from said first polymer containing at least one mol of ester monomer per mol of hydroxy group in the said first polymer wherein the ester monomer has the general formula:

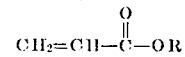

wherein R is an alkyl group having 5 or less carbon atoms;
    C. a catalyst selected from the group consisting of

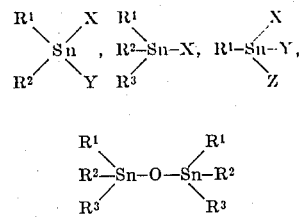

or

wherein $R^1$, $R^2$ and $R^3$ are 1 to 18 carbon atom alkyl or acyl groups and wherein
    X, Y, and Z are $R^5$ $$-\underset{\underset{O-}{\overset{\overset{O}{\|}}{C}}}{}$$

Cl—, Br—, I—, or —$OR^6$, wherein $R^5$ and $R^6$ are 1 to 18 carbon alkyl groups; and
    D. a solvent therefor.

2. The composition of claim 1 wherein the catalyst is selected from the dialky tin dicarboxylates, the dialkyl tin dichlorides, the trialkyl tin carboxylates, the trialkyl tin chlorides, and the trialkyl tin oxides.

3. The composition of claim 2 wherein the catalyst is dibutyl tin dilaurate.

4. The composition of claim 2 wherein the catalyst is dibutyl tin diacetate.

5. The composition of claim 2 wherein the catalyst is dibutyl tin dichloride.

6. The composition of claim 1 wherein the catalyst is present at the 0.5 to 10% weight level, based on the copolymer solids content.

* * * * *